United States Patent
Amezcua-Correa et al.

(10) Patent No.: US 9,810,557 B2
(45) Date of Patent: Nov. 7, 2017

(54) MULTICORE OPTICAL FIBER APPARATUS, METHODS, AND APPLICATIONS

(71) Applicant: UNIVERSITY OF CENTRAL FLORIDA RESEARCH FOUNDATION, INC., Orlando, FL (US)

(72) Inventors: Rodrigo Amezcua-Correa, Orlando, FL (US); Axel Schulzgen, Winter Park, FL (US); Jose Enrique Antonio Lopez, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 15/117,820

(22) PCT Filed: Feb. 4, 2015

(86) PCT No.: PCT/US2015/014356
§ 371 (c)(1),
(2) Date: Aug. 10, 2016

(87) PCT Pub. No.: WO2015/163963
PCT Pub. Date: Oct. 29, 2015

(65) Prior Publication Data
US 2017/0167899 A1    Jun. 15, 2017

Related U.S. Application Data

(60) Provisional application No. 61/979,057, filed on Apr. 14, 2014, provisional application No. 61/937,790, filed on Feb. 10, 2014.

(51) Int. Cl.
G02B 6/00 (2006.01)
G01D 5/353 (2006.01)
G01K 11/32 (2006.01)

(52) U.S. Cl.
CPC ....... *G01D 5/3538* (2013.01); *G01D 5/35329* (2013.01); *G01D 5/35351* (2013.01); *G01K 11/3206* (2013.01)

(58) Field of Classification Search
CPC ............ G01D 5/3538; G01D 5/35329; G01D 5/35351; G01K 11/3206
See application file for complete search history.

(56) References Cited

U.S. PATENT DOCUMENTS

| 5,067,815 | A | 11/1991 | Kotrotsios et al. |
| 7,889,332 | B2 * | 2/2011 | Omichi ................. G01B 11/18 250/225 |

(Continued)

FOREIGN PATENT DOCUMENTS

| CN | 102064884 A | 5/2011 |
| CN | 102117525 A | 7/2011 |

(Continued)

OTHER PUBLICATIONS

International Search Report and Written Opinion Form PCT/ISA/220, International Application No. PCT/US2015/014356, International Filing Date Feb. 4, 2015, dated Nov. 2, 2015, pp. 1-13.

(Continued)

*Primary Examiner* — Sung Pak
(74) *Attorney, Agent, or Firm* — Bond, Schoeneck & King, PLLC; William Greener; Alek Szecsy

(57) ABSTRACT

Fiber optic sensors based on multicore optical fibers that are intended for use in harsh environment sensing. This multicore fiber comprises an arrangement of optically coupled cores in a silica background. Sensors are fabricated by (Continued)

splicing a section of multicore fiber between two single mode fibers. This multicore fiber sensor is simple and repeatable to fabricate and multiple sensors can be multiplexed in a chain. These fiber optic sensors are intended for a broad set of sensing applications including temperature, pressure, strain, bending, acoustic vibrations, mechanical vibrations, or combinations thereof.

22 Claims, 10 Drawing Sheets

(56) References Cited

U.S. PATENT DOCUMENTS

| 8,725,001 | B2* | 5/2014 | Fini | G02B 6/02042 |
| | | | | 398/142 |
| 2004/0165809 | A1* | 8/2004 | Kersey | E21B 47/123 |
| | | | | 385/12 |
| 2011/0249940 | A1* | 10/2011 | Sasaoka | G02B 6/02042 |
| | | | | 385/39 |
| 2012/0188553 | A1 | 7/2012 | Wang et al. | |
| 2014/0029889 | A1* | 1/2014 | Brehm | G01D 11/00 |
| | | | | 385/12 |
| 2014/0119694 | A1* | 5/2014 | Abedin | G02B 6/02042 |
| | | | | 385/43 |
| 2014/0307304 | A1* | 10/2014 | Zhu | G02B 6/02347 |
| | | | | 359/341.3 |
| 2015/0168642 | A1* | 6/2015 | Mimura | H01S 3/06737 |
| | | | | 359/341.3 |
| 2016/0296122 | A1* | 10/2016 | Kim | A61B 5/01 |
| 2017/0155466 | A1* | 6/2017 | Zhou | H04J 14/04 |
| 2017/0160466 | A1* | 6/2017 | Imamura | G02B 6/02042 |

FOREIGN PATENT DOCUMENTS

| CN | 102322879 A | 1/2012 |
| JP | 04789565 B2 | 10/2011 |
| WO | 2011112846 | 9/2011 |

OTHER PUBLICATIONS

Zhao, Zhiyong et al., All-solid multi-core fiber-based multipath Mach-Zehnder interferometer for temperature sensing, Applied Physics B: Laers and Optics, vol. 112, No. 4, Sep. 2013, pp. 491-497.

Rugeland, Patrick and Margulis, Walter, Revisiting twin-core fiber sensors for high-temperature measurements, Applied Optics, vol. 51, No. 25, Aug. 30, 2012, pp. 6227-6232.

* cited by examiner

Fig. 1a  Fig. 1b  Fig. 1c  Fig. 1d
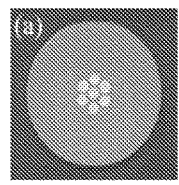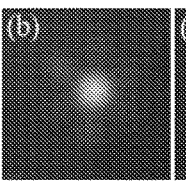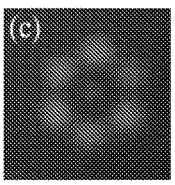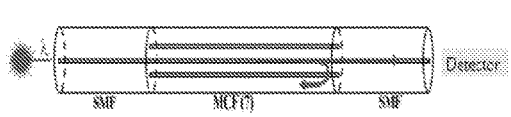
Fig. 1.
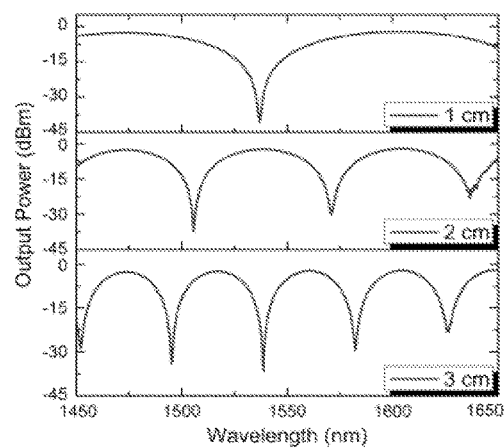
Fig. 2

MULTICORE OPTICAL FIBER APPARATUS, METHODS, AND APPLICATIONS

RELATED APPLICATION DATA

The instant application claims priority to U.S. provisional application Ser. No. 61/937,790 filed Feb. 10, 2014 and to U.S. provisional application Ser. No. 61/979,057 filed Apr. 14, 2014, the subject matters of which are incorporated herein by reference in their entireties.

FIELD

Embodiments disclosed herein relate generally to optical fiber sensors, sensing methods, and applications using the sensors and sensing methods; more particularly, to optical fiber sensors including one or more multicore fiber(s) (MCF) for sensing physical parameters such as temperature, pressure, vibrations, and position.

BACKGROUND

Fiber optic sensors have been successfully used in many applications such as structural monitoring, acoustic sensing, temperature and pressure sensing. Due to their immunity to electromagnetic interference, wide temperature range, and capability for long range interrogation, fiber optic sensors offer numerous advantages as compared to other sensing technologies. Fiber optic sensors are particularly well-suited for applications such as down-hole drilling, where high pressure, high temperatures, and extreme chemical environments are prevalent.

Based on fiber optics, several types of point sensors have been reported among which can be highlighted: fiber Bragg grating sensors, multimode interference sensors, and twin-core fiber sensors, as a few examples. A variety of multimode interference devices have been developed for fiber optic sensing; specifically, single mode-multimode-single mode devices, wherein a multimode fiber is spliced between two single mode fibers. These devices have shown great promise in high temperature and various other sensing applications. However, these devices offer little control over the interference produced, and/or require complicated fiber geometries using suspended cores or photonic crystal fiber, making their industrial implementation unpractical.

Zhao et al., All-solid multi-core fiber-based multipath Mach-Zehnder interferometer for temperature sensing, Appl. Phys. B (2013) 112:491-497 have reported an in-fiber integrated multipath Mach-Zehnder interferometer (m-MZI) fabricated by fusion splicing a segment of all-solid multi-core fiber (MCF) between two sections of single mode fiber-28 with a well-controlled lateral offset at the splice points for temperature sensing applications. Characteristics of the disclosed apparatus and methods include a large pitch—distance between each core, resulting in little or no optical interaction between cores, core index differences, off-center splicing wherein light launched into the cladding excites propagation modes in the central core, ambient cores, and cladding of the MCF, thus leading to multi-path interference between these modes, high insertion loss, a relatively long length of multicore fiber, and small modulation depths.

P. Rugeland and W. Margulis, Appl. Opt. 51, 6227 (2012) reported twin-core fiber devices to accurately measure elevated temperatures up to 700° C. However, many applications require accurate measurement of temperatures greater than this value.

A solution to the aforementioned problems, in a form that is inexpensive, durable, accurate, sensitive, providing high resolution, reproducible measurements, compact, stable, and reliable would be beneficial and advantageous, particularly by improving the performance of multimode interference optical fiber sensors, enabled by the novel multicore fiber (MCF) devices, methods, and applications disclosed as embodiments herein.

SUMMARY

In accordance with a non-limiting, generally descriptive aspect of the present invention, there is provided a fiber sensor (the 'device') fabricated by splicing a segment of particularly characterized MCF between two segments (input, output) of single mode, single core fiber. The excitation of various modes in the MCF by the single mode input fiber produces a periodic modulation of the spectral response of the device due to multimode interference in the MCF. The modulation may have up to a 50 dB dynamic range depending on the design of the MCF. Changes in certain physical parameters of interest of an external environment in which the device is being used will affect the multimode interference pattern, causing the spectrum to shift in wavelength. Monitoring this shift in the spectrum allows for accurate measurement of the physical parameters of interest, which include but are not limited to temperature, pressure, strain, vibration, and sound, in real time.

An embodiment of the invention is a fiber optic sensor. The sensor includes a single mode optical fiber (SMF)-multiple core optical fiber (MCF)-single mode optical fiber (SMF-MCF-SMF) set, which further includes a length segment of the multiple core optical fiber (MCF) having a central optical core and at least six optical cores arranged circumferentially about the central core, and a cladding having a refractive index, $n_c$, disposed there around, wherein each of the cores is characterized by a refractive index, $n_i$, each of which $n_i$ is greater than $n_c$; and two respective length segments of the single mode fiber (SMF) having a single, central optical core and a cladding there around, wherein the length segment of the MCF is positioned physically and optically in-between the two respective length segments of the SMF in a serial SMF-MCF-SMF relationship, wherein the central core of the length segment of the MCF is in optical alignment with the central cores of the two respective length segments of the SMFs.

The fiber optic sensor may be further characterized by one or more of the following features, attributes, or limitations alone or in various combinations of all or some of these further characterizations:

wherein the length segment of the MCF has a length between equal to or greater than five millimeters (mm) and equal to or less than 30 centimeters (cm);

wherein the length segment of the MCF and the two respective length segments of the SMFs are in a spliced SMF-MCF-SMF relationship;

wherein light propagated through the (SMF-MCF-SMF) set is characterized by a spectrally periodic transmission modulation due to multimode interference of the propagated light in the length segment of the MCF;

wherein the periodic modulation has a dynamic range between 1 dB to 50 dB;

wherein the periodic modulation has a dynamic range greater than 4 dB and equal to or less than 50 dB;

comprising a plurality of SMF-MCF-SMF sets disposed in a serially connected manner;

wherein at least some of the length segments of the MCFs have different lengths;
wherein any of the central core and any of the at least six circumferentially disposed optical cores of the MCF have a separation distance between 0.5 micrometers (μm) and 6 μm;
wherein the at least six circumferentially disposed optical cores have a symmetric distribution about the central optical core of the MCF;
wherein the fiber optic sensor is polarization independent;
wherein each of the at least seven optical cores of the MCF are Ge-doped cores embedded in a solid silica cladding;
wherein each of the at least seven optical cores of the MCF have a core diameter in the range from 4 μm to 16 μm;
wherein each of the at least seven optical cores have a numerical aperture (NA) in the range from 0.05 to 0.18;
characterized by a modulated transmission spectrum in at least one of an established L-band, a C-band, an O-band, an E-band, a U-band, and an S-band;
characterized by a measurable sensitivity to at least one of temperature change, an acoustic signal change, a pressure change, a strain change, and a bending radius change;
wherein at least some of the $n_i$ values are the same;
wherein all of the $n_i$ values are the same.

An embodiment of the invention is a sensing method or alternatively a method of using a fiber optic sensor. The method includes the steps of providing a single mode optical fiber (SMF)-multiple core optical fiber (MCF)-single mode optical fiber (SMF-MCF-SMF) set having serially/optically-aligned central cores; inputting a fundamental mode propagating in a leading (or input) one of the SMFs into the MCF; and exciting between two to eight supermodes in the MCF propagating therein comprising a periodic modulation of a spectral response of the sensor due to multimode interference of the two to eight supermodes in the MCF.

The method may be further characterized by one or more of the following features, attributes, limitations, or steps alone or in various combinations of all or some of these further characterizations:
detecting a change in the spectral response as a function of a change in a parameter of an external environmental in which the fiber optic sensor is operationally disposed;
measuring the change of a selected parameter of the external environment by monitoring the change in the spectral response;
wherein the selected parameter is at least one of temperature, pressure, acoustic, strain, and bending.

These and other aspects of the present invention will become apparent upon a review of the following detailed description and the claims appended hereto.

BRIEF DESCRIPTION OF THE DRAWINGS

FIG. 1a shows an image cross-section of a multicore (seven) fiber (MCF); FIGS. 1b and 1c show light distributions at different positions along the seven-core fiber axis; FIG. 1d shows a schematic diagram of a seven-core interferometric fiber sensor, according to an illustrative embodiment of the invention;

FIG. 2 shows measured spectral responses of MCF sensors for various lengths of the MCF segments, according to an illustrative embodiment of the invention;

DETAILED DESCRIPTION

Figure 3:
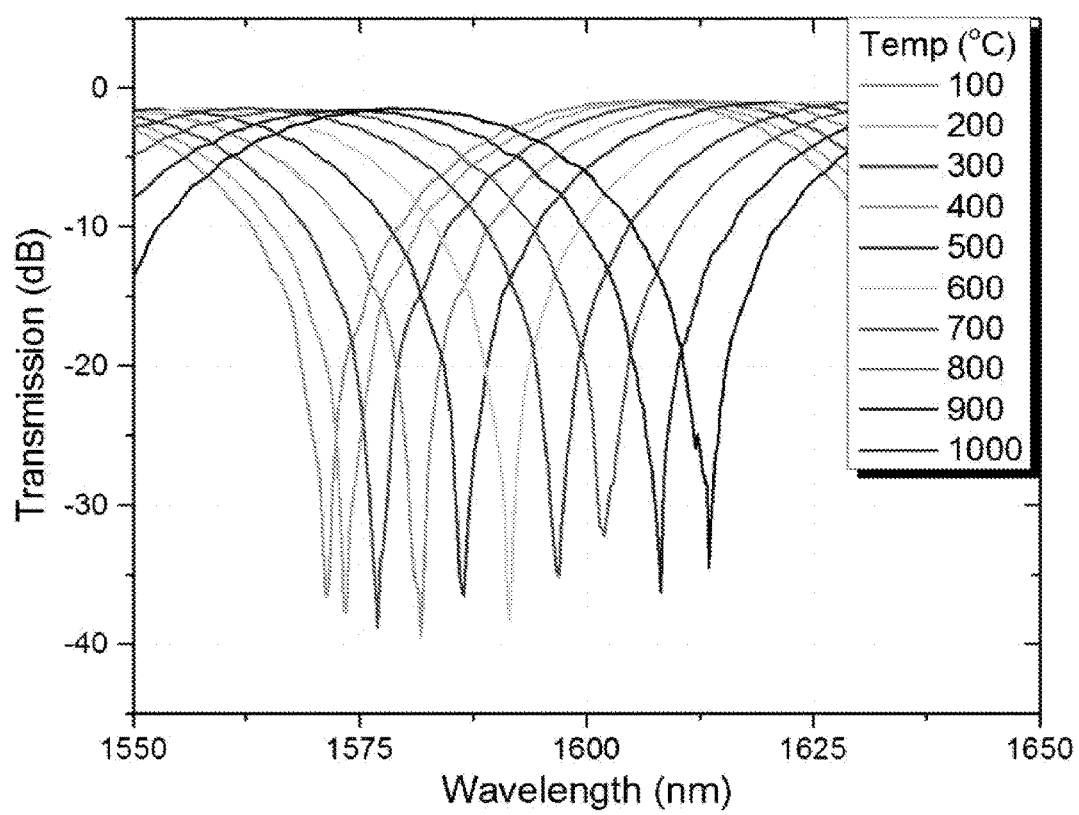
FIG. 3 shows the superimposed measured spectral response of a sensor with 2 cm of seven-core fiber as a function of temperature, according to an illustrative embodiment of the invention.

A fiber optic sensor in accordance with a non-limiting aspect is illustrated in FIG. 1. The sensor is fabricated by splicing a short, few-centimeter long segment of MCF between two standard single mode fibers (SMFs) as shown in FIG. 1(d). As further described below, the measurement principle is mode interference within the MCF segment, which results in deep notches in the transmission spectra shown in FIG. 2. With increasing temperatures, the spectral positions of these notches shift to longer wavelengths due to changes in refractive indices and thermal expansion. The sensitivity of the interferometric measurement scheme provides accuracy and high resolution, while the compact device structure results in stability, reproducibility, and reliability up to the highest temperatures to which the base glass can be exposed.

In this exemplary embodiment, the MCF contains seven strongly coupled Ge-doped cores embedded in a pure silica cladding. A cross section image of this MCF is shown in FIG. 1(a). The seven cores have diameters of about 9 μm and numerical apertures of 0.142, and the cladding diameter is 120 μm. The MCF sensor device was fabricated by splicing a small section of this 7-core fiber between two segments of SMF-28, which act as the input and output ports for the light. When light is launched from the SMF into the MCF, several modes can be excited. Due to the MCF symmetry, only two supermodes of the MCF are excited by the fundamental mode of the input SMF at center-core excitation. As light propagates down the length of the MCF segment, the interference between the two excited modes results in continuously varying spatial patterns along the fiber axis. Two of those patterns calculated for two different positions are shown in FIGS. 1(b) and 1(c), illustrating the cross-coupling between central and surrounding cores during propagation.

In the spectral domain, the multimode interference in the MCF segment produces a periodic modulation of the transmission measured through the SMF-MCF-SMF device. The spectral periodicity of the transmission signal strongly depends on the length of the MCF segment. As is shown in FIG. 2 (top), a one (1) cm MCF segment produces only one deep notch around 1537 nm within the range between 1450 and 1650 nm. In contrast, several deep notches at various wavelengths can be observed for MCF segments of two (2) and three (3) cm length as shown, respectively, in FIG. 2 (middle) and FIG. 2 (bottom). Between notches, high transmission is observed, indicating almost perfect reconstruction of the launched intensity pattern at the end of the MCF segment for these wavelengths.

Physical external changes affect the MCF interference pattern causing the transmission spectrum to shift in wavelength. Tracking these wavelength shifts allows for accurate and reliable measurements of external perturbations in real time. Since the refractive index depends on the temperature through the thermo-optic effect and thermal expansion or contraction takes place, the interference pattern depends also on the temperature. In order to demonstrate the MCF-based temperature sensor functionality, a device with a 2 cm MCF segment was tested. The sensor was placed in a horizontal tube furnace by Lindberg, and its transmission was monitored. To do so, light from a superluminescent diode (SLD 1550S-A1) with a wavelength range from 1550 to 1650 nm was coupled into the SMF input port. After propagation through the sensor, the transmitted light exiting from the SMF output port was monitored by an optical spectrum analyzer (OSA) by Agilent.

In order to avoid any impact induced by bending, the input and output SMF ends were fixed outside of the furnace to keep the sensor straight. With the purpose of eliminating all the residual stress in the MCF that has been accumulated during the fiber drawing phase the device was first subjected to a long annealing process, being heated up to 1000° C. and maintained at this temperature for about 10 h. It was then passively cooled down until it reached room temperature. At room temperature, this device features a deep transmission notch close to 1569 nm. During the annealing process, an expected red shift was observed up to 1000° C. At 1000° C., a red shift was observed during the first few minutes of annealing followed by a blue shift despite the constant temperature of 1000° C. After about 6 h of annealing at 1000° C., the sensor transmission spectrum stabilized and remained stable throughout the final 4 h.

After the annealing process, the sensor was tested stepwise by heating up and cooling down the furnace. FIG. 3 shows the spectral response of the MCF sensor for 100° C. increments changed in 30 minute intervals. As expected, the wavelength of the deep notch shifts to longer wavelengths as the temperature is increased. Between room temperature and 1000° C., the transmission minimum shifts a total of 43.5 nm, from 1469 to 1613.5 nm. The insertion loss of the MCF device and the fringe visibility were obtained as 1 and 37 dB, respectively, which outperforms most of the sensors based on interference effects reported so far.

Figure 4:
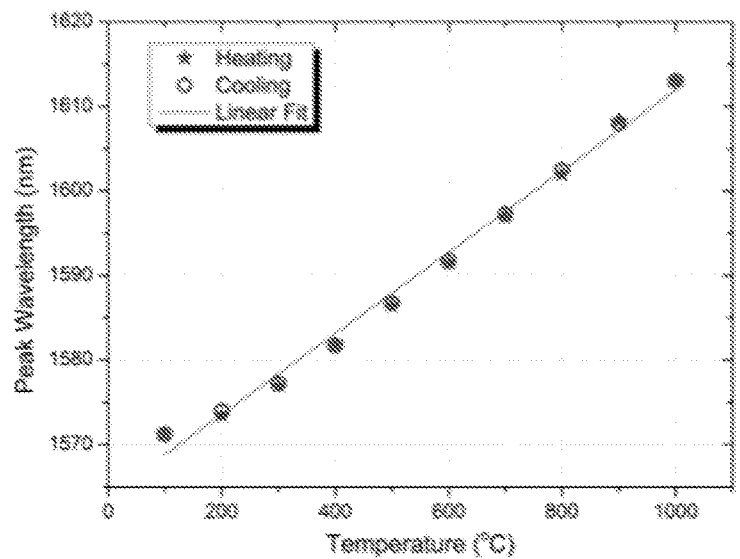
FIG. 4 graphically shows measured spectral shifts vs temperature during heating and cooling, according to an illustrative embodiment of the invention.

FIG. 4 shows the wavelength shift of the transmission minimum versus temperature. The stars and pentagons have been measured during the heating and the cooling cycle, respectively. Data points for increasing and decreasing temperatures match very well for all temperatures, showing no thermal hysteresis of the MCF device. This stable and accurate performance up to the highest temperatures should be attributed to the successful annealing process, which eliminates residual stress and thermal memory. As shown in FIG. 4, the sensor response can be approximated by two linear fits of the transmission minimum shift with temperature, for two temperature ranges. For the temperature range of 100° C.-300° C., a shift of ~28.7 pm/° C. is obtained. For higher temperatures in the range of 300° C.-1000° C., a sensitivity of ~51.7 pm/C is obtained. More accurate calibration can be performed to account for the variations of thermooptic effects with temperature.

In order to demonstrate the reproducibility and accuracy of the response of the MCF temperature sensor, the heating and cooling cycle was repeated three times with the same steps and under the same conditions. During all of these cycles, a maximum variation of less than 2% in a temperature-induced shift has been measured and no hysteresis has been observed during any of the tests. This further emphasized the repeatability and reliability of the MCF sensor performance during high-temperature measurements.

Figure 5:
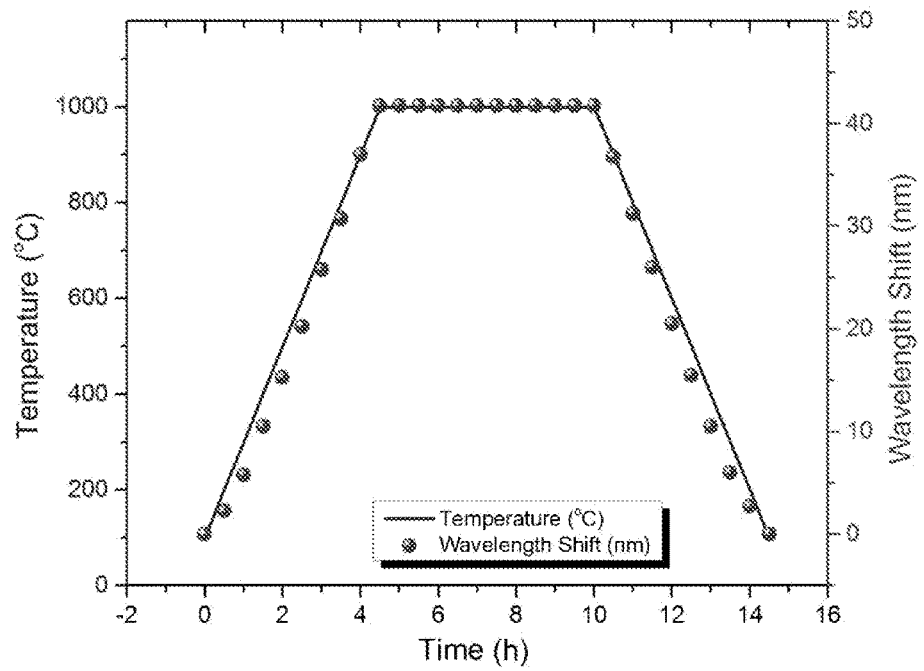
FIG. 5 graphically shows the time evolution of the wavelength shift of the MCF sensor during a long cycle of temperature variations, according to an illustrative embodiment of the invention.

To further prove the sensor's stability at high temperatures, the sensor was exposed to 1000° C. for 5 h and subsequently passively cooled down in 100° C. steps. FIG. 5 shows the time evolution of the wavelength (spheres) and temperature shift (line) as the MCF was heated, kept at 1000° C., and cooled down to room temperature. A very stable response from the sensor was observed at long time measurements under high-temperature conditions. It is significant to note that this heating was kept at 1000° C. and the cooling cycle was also repeated three times, obtaining the same results each time for all tests. FIG. 5 also shows that during the complete cycle, the MCF sensor exhibited a maximum wavelength deviation of ~0.5 nm, equivalent to 9.6° C.

Figure 6:
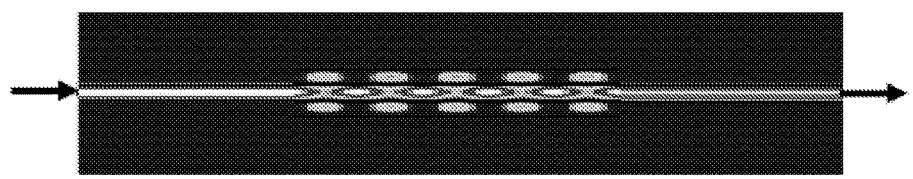
FIG. 6 schematically shows calculated supermode inference behavior in the MCF, according to an illustrative embodiment of the invention.

The single mode-multicore-single mode (SMF-MCF-SMF) device described herein above, where a multicore fiber (MCF) is spliced between two single mode fibers (SMFs), operates on the principle of supermode interference. The MCF with seven coupled cores supports seven supermodes. Due to the modes' symmetries, only two of these supermodes are excited by the fundamental mode of the SMF. The supermode interference will result in an oscillation of the power between these two supermodes as the light propagates down the MCF, as shown in FIG. 6. Spectrally, the supermode interference generates a periodic transmission spectrum of the SMS device. The modulation has up to 50 dB dynamic range, depending on the design of the MCF. Changes in temperature affect the refractive index and the length of the MCF section, causing the transmission to shift in wavelength. Monitoring this shift in the transmission spectrum allows for accurate temperature measurement in real time.

Figure 7:
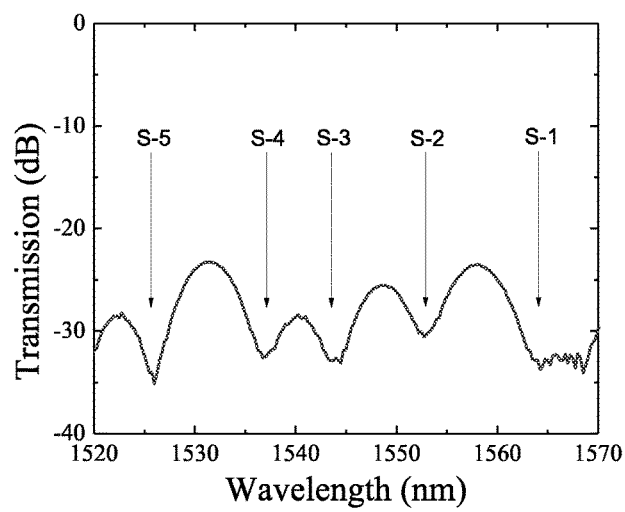
FIG. 7 graphically shows the transmission spectrum of multiplexed sensor chain showing five minima, according to an illustrative embodiment of the invention.
Figure 8:
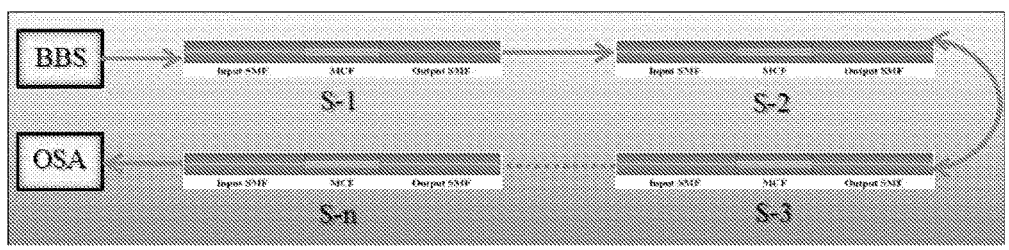
FIG. 8 schematically shows a serial chain of MCF sensor devices, according to an illustrative embodiment of the invention.

As an additional advantage of this device, the overall high transmission and high extinction ratio of 30-40 dB allowed for multiplexing of multiple (five were tested) sensors within the C-band. Each sensor retained high resolution minima and could be independently monitored with a single interrogation system, as shown in FIG. 7. FIG. 8 illustrates a general scheme of a chain of several MCF devices placed in series. The chain can be built through simple splicing of several SMF-MCF-SMF arrangements with slight differences in the MCF length of each device to ensure a different wavelength notch position for each sensor.

In arriving at an optimized 7-core MCF design, several multicore fiber designs were explored through simulation and experiment for their use in SMS devices for highly multiplexed sensing applications. Specifically, the coupling from SMF to MCF and the supermode interference produced were studied with a focus on seven- and 19-core fiber structures, using a finite difference method (FDM) mode solver (Firmware, Photon Design). The FDM has previously been used for finding the modes of similar MMI fiber-sensing devices.

Figure 9:
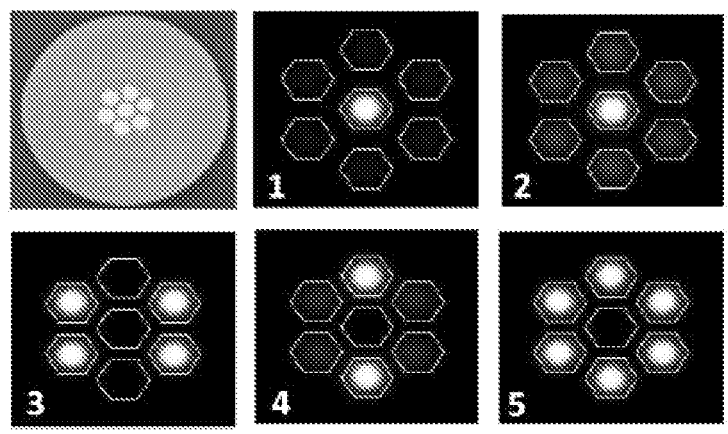
FIG. 9 shows a cross sectional image of a seven-core fiber facet and simulated supermodes supported by the seven-core fiber, according to an illustrative embodiment of the invention.

A fiber with seven coupled cores supports seven supermodes, as illustrated in FIG. 9 (modes 3 and 4 are degenerate in intensity with differing phases across the cores). Only two of the supermodes are excited by the fundamental mode of the SMF, modes 1 and 2, due to their circular symmetry and center-core excitation.

The interference between these two supermodes will result in a periodic coupling of the power between the center and outer cores as the light propagates down the MCF (see FIG. 6). Spectrally, the interference generates a periodic transmission spectrum of the SMS device. The physical origin of this spectral periodicity is the difference in the propagation constants ($\Delta\beta$) of the supermodes. The wavelength dependence of $\Delta\beta$ causes the MCF to act similarly to a directional coupler, in which the coupling constant between the waveguides is directly proportional to wavelength. As the difference in propagation constants varies with wavelength, the power distribution across the cores at the facet of the second SMF will vary periodically in the spectral domain, and the amount of light collected by the second SMF will vary accordingly. The transmission modulation period and modulation depth are highly dependent on several MCF design parameters, such as number of cores, core size, and core-to-core spacing. For a seven-core fiber, the transmission spectrum is clearly periodic with sharp spectral features due to the interference of only two supermodes.

Figure 10:
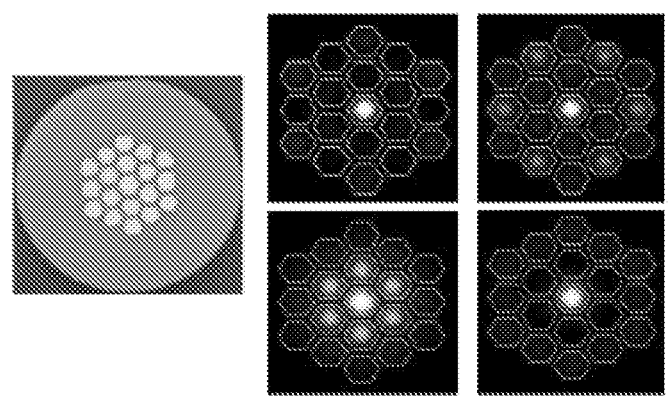
FIG. 10 shows a cross sectional image of a 19-core fiber facet and simulated supermodes excited by the SMF in the 19-core fiber, according to an illustrative embodiment of the invention.

In contrast, a 19-core fiber supports 19 supermodes; four are circularly symmetric modes with central-core excitation. Therefore, four supermodes are excited by the fundamental mode of SMF, as shown in FIG. 10, creating a more complicated interference pattern with more complex periodicity and less sharp spectral features.

Figure 11:
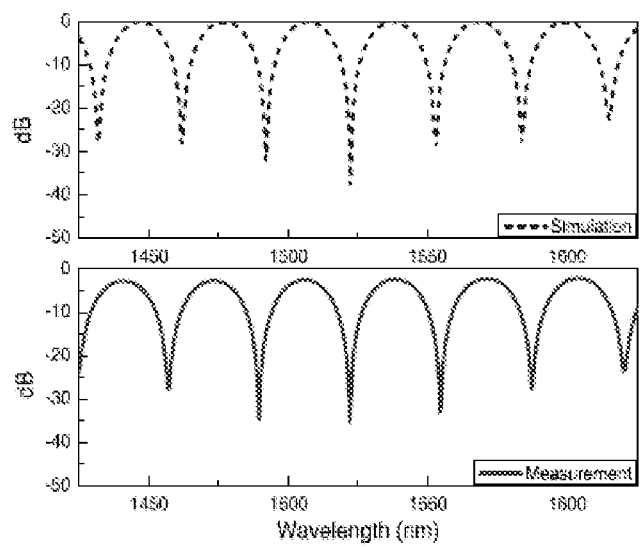
FIG. 11 shows the transmission spectra comparison between simulation and experiment for SMS devices using both seven- and 19-core fiber with 4 and 12 cm of (a) seven- and (b) 19-core fiber, respectively, according to an illustrative embodiment of the invention.
Figure 11:
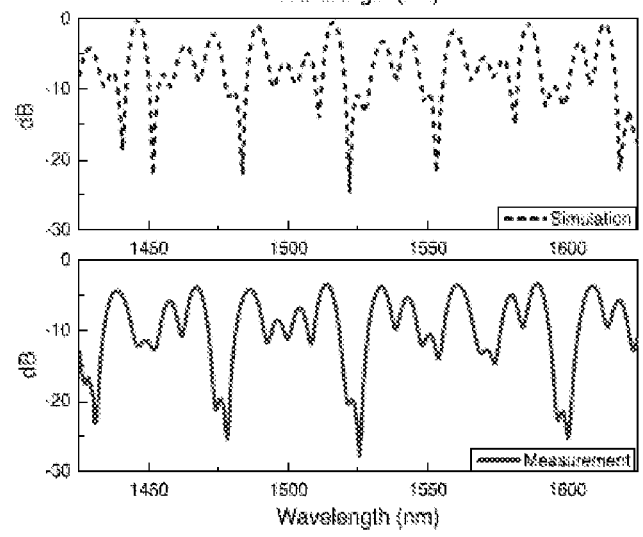

FIG. 11 shows the transmission spectra comparison between simulation and experiment for SMS devices using both seven- and 19-core fiber. The multicore fiber was fabricated from Ge-doped silica with an NA of 0.14 and group index of 1.455 and 1.454, for modes 1 and 2, respectively, at 1550 nm for the seven-core fiber. Between two sections of SMF (SMF-28 was used in all simulations and experiments), 4 cm of seven-core fiber and 12 cm of 19-core fiber were used. These lengths were chosen because of the dependence of the modulation period on the MMF length. Due to the more complicated supermode interference of the 19-core fiber, the reproduction length is longer; therefore, a longer section is needed to ensure several periods of modulation within the spectral range of interest. Any slight variation between the simulation and the experiment can be attributed to the margin of error in measuring the geometry and refractive index profile of the drawn fiber. Particularly, the 19-core fiber showed deformations in the outer ring of cores, shown in FIG. 10, further complicating the supermode interference and causing small differences between the experimental and simulated data.

Figure 12A:
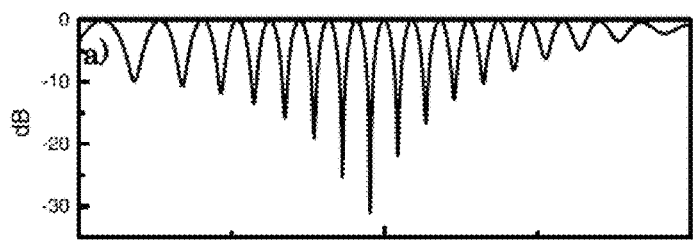
FIG. 12 graphically shows a calculated spectral response of a MCF sensor illustrating the dependence of the modulation depth on the mode fractional power of the interfering supermodes in the seven-core fiber; a) demonstrates that the modulation depth depends on the wavelength; b) shows that the mode fractional power excited in the seven-core fiber depends on the wavelength. Comparing a) and b) demonstrates that maximum modulation depth occurs at equal excitation of the two interfering supermode, according to an illustrative embodiment of the invention.
Figure 12B:
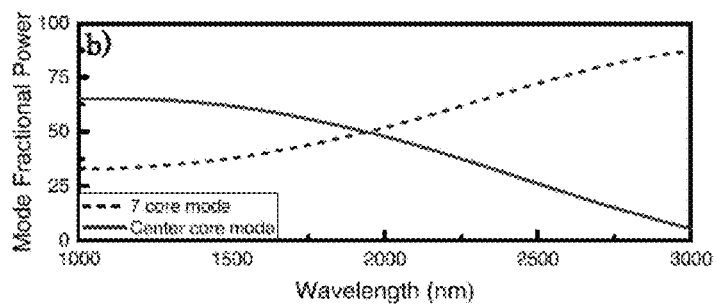

Due to its simpler transmission spectrum with more predictability and sharper spectral features, the seven core fiber was selected for more detailed investigation in order to obtain an optimum geometry for multiplexed temperature sensing. The requirements for multiplexing are sharp spectral features with high overall transmission between these features. FIG. 12 demonstrates that maximum modulation depth occurs at equal excitation of the two interfering supermodes. This is because when the modes are equal in amplitude, complete destructive interference in the center core is possible. The fractional power excited in the supermodes depends on the mode field diameter (MFD) overlap of the fundamental mode of the SMF and the supermodes of the MCF. Due to dispersion, the MFDs are wavelength dependent. FIG. 12 shows the maximum modulation depth occurring at the wavelength for which both interfering supermodes are equally excited by the SMF. With unequal mode overlap, there is still supermode interference, but the minima are less sharp. At equal coupling, the minima can reach −40 dB for the considered seven-core fiber. Therefore, when designing the SMS device, the mode coupling between the SMF and MCF must be examined for the wavelength range for which it will be interrogated in order to achieve the sharpest spectral features possible.

Figure 13A:
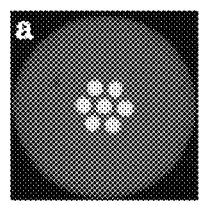
FIG. 13: Facet image of MCF with (a) 9.5 μm cores and 13.6 μm pitch, (b) 9.2 μm cores and 11 μm pitch, and (c) measured transmission spectra, according to an illustrative embodiment of the invention.
Figure 13B:
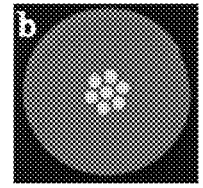
Figure 13C:
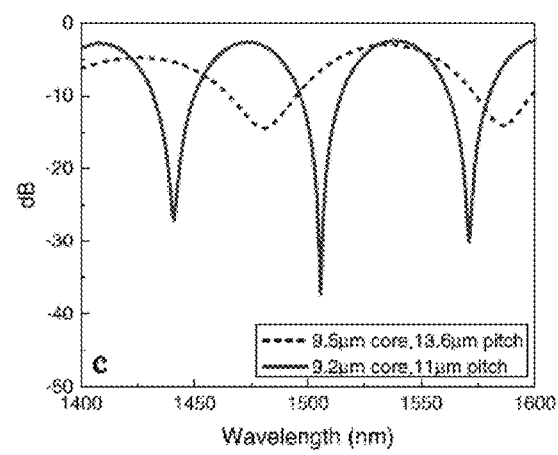

Two seven-core fibers were fabricated with different geometries; the difference caused by the change in MFDs of the supermodes is clearly shown when comparing the transmission spectra. The first fiber, shown in FIG. 13a, has 9.5 pm diameter cores, a 13.6 pm pitch, and a 125 pm outer diameter. This causes unequal excitation of the two supermodes with about 61% and 38% for the center-only and all-core modes, respectively, as found through simulation. Shown in FIG. 13c, the maximum depth of modulation for this fiber in an SMS device was only −12 dB.

However, the second seven-core fiber, fabricated with the same glass material and drawing parameters, has almost exactly equal mode excitation near 1550 nm. Here, the core diameter was 9.2 μm (FIG. 13b), the pitch 11 μm, and the outer diameter 125 μm. The minimum depth achieved in this case was better than −35 dB, showing the sensitivity of the SMS transmission spectrum with respect to the multicore geometry. The experiment and simulation show that the second fiber design is very close to optimal in the C-band, which is our spectral region of interest. This optimal wavelength region can be tuned over hundreds of nanometers for other applications, as needed, by changing the MCF geometry or the SMF input if the individual cores remain single mode at the selected wavelength.

Figure 14:
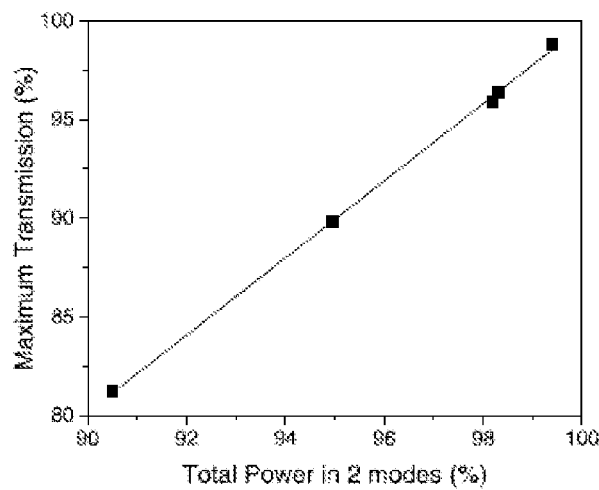
FIG. 14 graphically shows calculations showing maximum transmission occurring when power is excited in two interfering supermodes, according to an illustrative embodiment of the invention.

Next, we focused on obtaining maximum transmission for optimal multiplexing. Maximum overall transmission occurs when the mode of the SMF can be perfectly represented by a superposition of the two excited MCF modes. FIG. 14 shows that as the total excited power approaches 100% in the interfering modes, the total transmission of the SMS device also approaches 100%. High overall transmission is crucial for systems with high levels of multiplexing. Additionally, the total loss through the device, including two SMF-MCF splices, has been experimentally measured as less than 0.05 dB, showing low mode-field mismatch, low splice loss, and low propagation loss in the MCF (which is on the order of a few dB/km and, therefore, negligible for these short devices).

Figure 15:
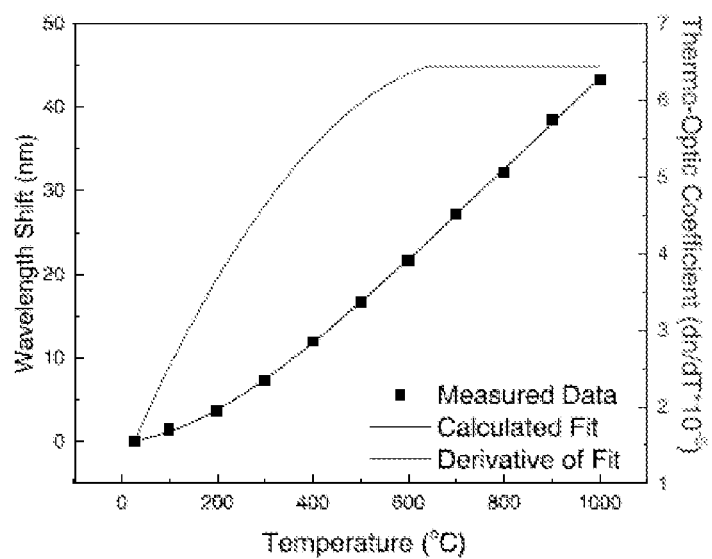
FIG. 15 graphically shows the spectral shift of the SMS device, with fit and calculated thermo-optic coefficient, according to an illustrative embodiment of the invention.

As this device is proposed as a temperature sensor, the sensitivity of the SMS devices to external environments has also been investigated. Using the thermal expansion and thermo-optic coefficients for silica fiber, adjustments in the refractive index and length of the MCF section can be applied, simulating temperature shifts. In simulation, the transmission spectra were shown to shift linearly with temperature for both the seven- and 19-core fibers, directly proportional to the thermo-optic coefficient (dn/dT). However, FIG. 15 shows a measurement of a seven-core SMS device, with a non-constant slope of the wavelength shift with temperature.

The nonlinear wavelength shift indicates a change in the properties of the glass at different temperatures, and, therefore, a change in the thermo-optic coefficient (dn/dT). The thermal expansion coefficient of fused silica is much lower than dn/dT, and was found to be negligible for these measurements. The shift of the thermo-optic coefficient of fused silica with temperature has previously been investigated at cryogenic temperatures, finding a linear relationship between dn/dT and temperature. The thermo-optic coefficient in our simulation was adjusted to match the measured spectral shift, enabling the determination of dn/dT as a function of temperature for this fiber device. In FIG. 15, the wavelength shift fits a cubic function well from 0° C. to 600° C., and a linear function from 600° C. to 1000° C. The plain (upper) curve is the derivative of the wavelength shift fitting functions, which measures the sensitivity of the SMS device as a function of temperature. Using simulation data, the sensitivity can then be correlated to the thermo-optic coefficient of the MCF. Near room temperature, the calculated thermo-optic coefficient is about $1.5 \times 10^{-5}/°$ C. This value is in the range of previous measurements of fused silica at this temperature.

The foregoing disclosure and associated figures support a detailed investigation of MCF-based MMI devices for use in high-temperature sensing. The supermode interference and transmission spectra of SMS devices have been simulated and matched to experimental data. Understanding the mode coupling between SMF and MCF allows for the design of devices with sharp spectral features with up to 40 dB resolution for a chosen region of the optical spectrum. We have also shown the determination of the thermo-optic coefficient of our MCF as a function of temperature. The overall high transmission enables multiplexing of a large number of devices within a narrow wavelength range for distributed sensing along a measurement chain. These sensors are simple to fabricate, requiring only two standard splices between SMF and MCF, and have been shown to operate stably in temperatures up to 1000° C. This high temperature range makes these devices suitable for industries such as down-hole drilling and in nuclear reactor facilities. Additionally, this MCF fiber is sensitive to other external changes, such as bending, for example, increasing its range of applicability as a sensor device.

A curvature sensor based on a MCF has also been fabricated and tested. An exemplary device comprises of a few-millimeter-long piece of seven-core fiber spliced between two single mode fibers. When the optical fiber device is kept straight, a fixed interference pattern appears in the transmission spectrum as described above. However, when the device is bent, a shift in the transmission minima is produced and the visibility of the interference notches changes. This allows for using either visibility or spectral shift for sensor interrogation.

If the distance between the cores in a MCF is small enough to allow significant core-to-core coupling, various supermodes can be supported by the MCF structure, leading to supermode interference effects when light propagates down the length of the MCF. This interference is very sensitive to external mechanical disturbances such as bending. The structure of an exemplary seven-core fiber sensor is as described herein above.

The multicore fiber used in this embodiment supports seven supermodes (each with two-fold polarization degeneracy). However, as a result of the excitation by the fundamental mode of the SMF, only two supermodes are excited. After propagation through the MCF these excited supermodes are re-coupled into the second SMF. As a result of the interference between the excited supermodes a periodic transmission spectrum is generated. When the device is bent, the symmetry of the seven-core fiber is perturbed and the interference between supermodes changes. Considering the transmission spectrum, a spectral shift that depends directly on the curvature radius of the fiber is the most pronounced effect. In addition, a change in the interference fringe contrast is observed in the transmission spectrum when the device is bent. Thus, fringe visibility can also be utilized to determine the bending radius.

In an experimental set up used to characterize the bending response of the SMF-MCF-SMF device, each sensor device was fixed on a thin sheet of metal with a length of 316 mm, whose ends were fixed to translation stages so that by a relative inward movement the curvature radius could be varied.

Figure 16A:
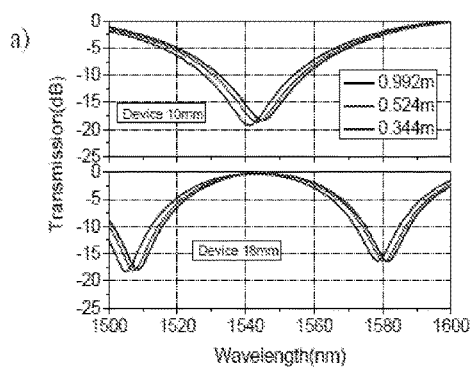
FIG. 16: a) Measured sensor device transmission spectra when the length of the seven-core fiber segment is 10 mm (upper graphs) and 18 mm (bottom graphs) for three different bending radii; b) Relationship between length of seven-core fiber segment and interference fringe separation of the device sensor fabricated (exponential fit); Inset: Inverse of the seven-core fiber segment length versus interference fringe separation (lineal fit), according to an illustrative embodiment of the invention.
Figure 16B:
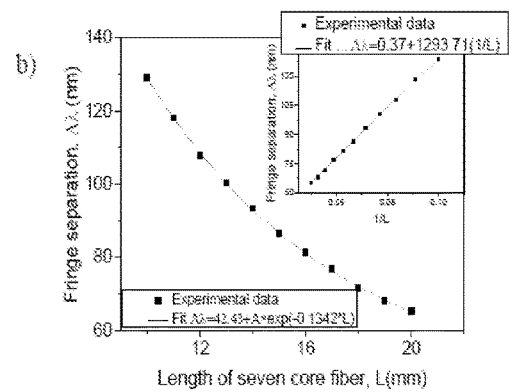
Figure 17A:
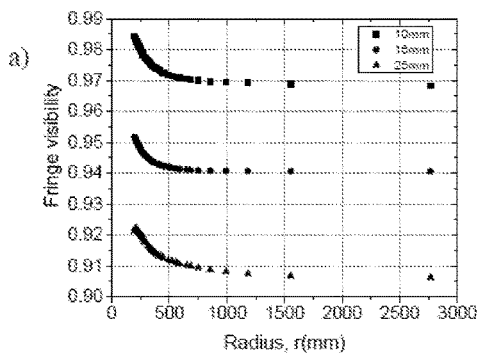
FIG. 17: a) Fringe visibility versus curvature radius for three different seven-core fiber segment lengths: 10 mm (squares), 16 mm (circles), and 25 mm (triangles); b) Wavelength shift versus bending radius of the sensor device with 10 mm seven-core fiber segment length with a linear fit of the most sensitive curvature range between 200 mm and 400 mm; Inset: Wavelength shift vs. inverse radius of curvature and a linear fit for curvatures between 200 mm and 400 mm, according to an illustrative embodiment of the invention.

The transmission spectra of two sensor devices with seven-core fiber segments of 10 mm and 18 mm length, respectively, are shown in FIG. 16a. For each device the transmission spectra for three different curvature radii are plotted. Note that both the peak wavelength and the amplitude modulation are clearly dependent on the fiber radius of curvature. Adding to the spectral shifts and amplitude modulations, a dependence on the seven-core fiber length can be observed. The relationship between fringe separation and length of seven core fiber is shown in FIG. 16b. It shows that the fringe period is linearly dependent on the inverse of the length of seven-core fiber segment (inset curve) and can also be fitted to an exponential dependence on the length of seven-core fiber segment. In most interferometric applications, fringe visibility can be used to evaluate the quality of the fringe pattern. A measurement of the fringe visibility versus curvature radius of three seven-core fiber segments with lengths of 10, 16, and 25 mm, respectively, is shown in FIG. 17a. Taking into consideration that the limiting value of the visibility is unity, it is inferred that longer length devices can be used to measure small curvature radii, whereas shorter lengths can be used to measure large bending radii.

Figure 17B:
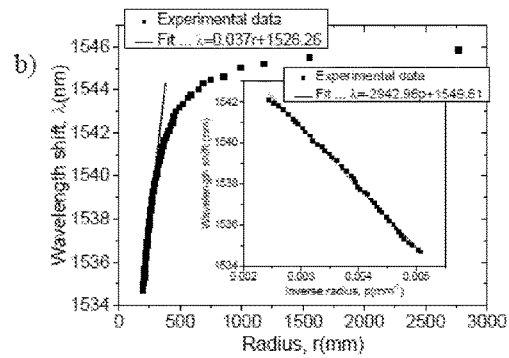

In addition to the sensor interrogation via visibility, the shift of the wavelength with maximum attenuation can be alternatively measured to obtain the fiber radius of curvature. The dependence of the wavelength shift on the bending radius from the sensor device with a 10 mm long segment of seven-core fiber is shown in FIG. 17b. The most sensitive bending radius region is between 200 mm and 450 mm. In this range the sensitivity is 37 pm/mm in terms of radius of curvature or 2943 nm/mm$^{-1}$ in terms of inverse radius of curvature.

A robust, external refractive index insensitive, very easy to construct, and highly bend sensitive optical fiber sensor based on specially designed seven-core fiber has been demonstrated. The seven-core fiber, spliced between two SMFs, acts an interferometer that can be used to interrogate by measuring either the fringe visibility or the wavelength shift of the mode interference pattern observed in the transmission spectra. The transmission spectra produced by supermode interference is both stable and sensitive because only two supermodes are excited by the fundamental mode of the input single mode fiber. When fringe visibility is used for interrogated, the sensitivity (dynamic range) of our devices can be tailored by selecting a proper length of the seven-core fiber segment. Using wavelength shifts to determine the bending, our device exhibits a sensitivity of ~40 pm/mm or 3000 nm/mm$^{-1}$ in terms of curvature radius or inverse curvature radius, respectively, within the range of 200 mm to 400 mm bending.

Figure 18A:
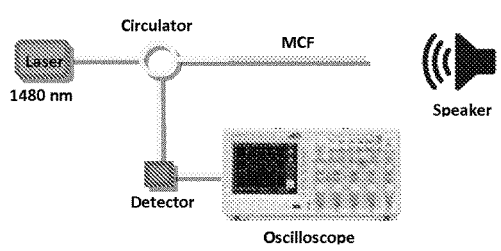
FIG. 18: a) Experimental setup for testing a multicore fiber based acoustic sensor; b) Oscilloscope trace showing the optical signal change in response to an acoustic signal with a frequency of about 20 kHz.
Figure 18B:
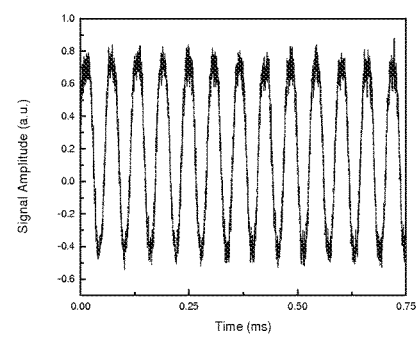

An acoustic MCF sensor has also been fabricated and tested. The device was tested using a signal from a 1480 nm laser for interrogation as illustrated in FIG. 18a. The change in amplitude of the received optical signal and its frequency can be utilized to measure the presence of an acoustic wave as shown in FIG. 18b. While here the response to an about 20 kHz acoustic wave is shown, it is expected that the range of detectable frequencies could include a few Hz to several MHz.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A fiber optic sensor, comprising:
   a single mode optical fiber (SMF)-multiple core optical fiber (MCF)-single mode optical fiber (SMF-MCF-SMF) set, the set further comprising:
      a length segment of the multiple core optical fiber (MCF) having a central optical core and at least six optical cores disposed circumferentially about the central core, and a cladding having a refractive index, $n_c$, disposed there around, wherein each of the cores is characterized by a refractive index, $n_i$, each of which $n_i$ is greater than $n_c$; and
      two respective length segments of the single mode fiber (SMF) having a single, central optical core and a cladding there around,
   wherein the length segment of the MCF is disposed intermediate the two respective length segments of the SMF in a serial SMF-MCF-SMF relationship, wherein the central core of the length segment of the MCF is in optical alignment with the central cores of the two respective length segments of the SMFs.

2. The fiber optic sensor of claim 1, further wherein the length segment of the MCF has a length between equal to or greater than five millimeters (mm) and equal to or less than 30 centimeters (cm).

3. The fiber optic sensor of claim 1, further wherein the length segment of the MCF and the two respective length segments of the SMFs are in a spliced SMF-MCF-SMF relationship.

4. The fiber optic sensor of claim 1, wherein light propagated through the (SMF-MCF-SMF) set is characterized by a spectrally periodic transmission modulation due to multimode interference of the propagated light in the length segment of the MCF.

5. The fiber optic sensor of claim 4, wherein the periodic modulation has a dynamic range between 1 dB to 50 dB.

6. The fiber optic sensor of claim 4, wherein the periodic modulation has a dynamic range greater than 4 dB and equal to or less than 50 dB.

7. The fiber optic sensor of claim 1, further comprising a plurality of SMF-MCF-SMF sets disposed in a serially connected manner.

8. The fiber optic sensor of claim 7, wherein at least some of the length segments of the MCFs have different lengths.

9. The fiber optic sensor of claim 1, wherein any of the central core and any of the at least six circumferentially disposed optical cores of the MCF have a separation distance between 0.5 micrometers (μm) and 6 μm.

10. The fiber optic sensor of claim 1, wherein the at least six optical cores have a symmetric distribution about the central optical core of the MCF.

11. The fiber optic sensor of claim 1, wherein the fiber optic sensor is polarization independent.

12. The fiber optic sensor of claim 1, wherein each of the at least seven optical cores of the MCF are Ge-doped cores embedded in a solid silica cladding.

13. The fiber optic sensor of claim 1, wherein each of the at least seven optical cores of the MCF have a core diameter in the range from 4 μm to 16 μm.

14. The fiber optic sensor of claim 1, wherein each of the at least seven optical cores have a numerical aperture (NA) in the range from 0.05 to 0.18.

15. The fiber optic sensor of claim 1, characterized by a modulated transmission spectrum in at least one of an established L-band, a C-band, an O-band, an E-band, a U-band, and an S-band.

16. The fiber optic sensor of claim 1, characterized by a measurable sensitivity to at least one of temperature change, an acoustic signal change, a pressure change, a strain change, and a bending radius change.

17. The fiber optic sensor of claim 1, wherein at least some of the $n_i$ values are the same.

18. The fiber optic sensor of claim 1, wherein all of the $n_i$ values are the same.

19. A method of using a fiber optic sensor comprising:
    providing a single mode optical fiber (SMF)-multiple core optical fiber (MCF)-single mode optical fiber (SMF-MCF-SMF) set having serially/optically-aligned central cores;
    inputting a fundamental mode propagating in a leading one of the SMFs into the MCF; and
    exciting between two to eight supermodes in the MCF propagating therein comprising a periodic modulation of a spectral response of the sensor due to multimode interference of the two to eight supermodes in the MCF.

20. The method of claim 19, further comprising detecting a change in the spectral response as a function of a change in a parameter of an external environmental in which the fiber optic sensor is operationally disposed.

21. The method of claim 20, further comprising measuring the change of a selected parameter of the external environment by monitoring the change in the spectral response.

22. The method of claim 21, wherein the selected parameter is at least one of temperature, pressure, acoustic, strain, and bending.

* * * * *